(12) United States Patent
Masciolini et al.

(10) Patent No.: US 10,676,156 B2
(45) Date of Patent: Jun. 9, 2020

(54) BICYCLE CONTROL DEVICE

(71) Applicant: CAMPAGNOLO S.r.l., Vicenza (IT)

(72) Inventors: Marco Masciolini, Padua (IT); Fabiano Fossato, Campagna Lupia (IT); Francesco Negrin, Noventa Padovana (IT)

(73) Assignee: CAMPAGNOLO S.R.L., Vicenza (IT)

( * ) Notice: Subject to any disclaimer, the term of this patent is extended or adjusted under 35 U.S.C. 154(b) by 367 days.

(21) Appl. No.: 15/664,241

(22) Filed: Jul. 31, 2017

(65) Prior Publication Data
US 2018/0037299 A1  Feb. 8, 2018

(30) Foreign Application Priority Data

Aug. 2, 2016  (IT) ......................... 102016000081324

(51) Int. Cl.
*B62M 25/08* (2006.01)
*H01H 5/02* (2006.01)
(Continued)

(52) U.S. Cl.
CPC ............ *B62M 25/08* (2013.01); *B62K 23/06* (2013.01); *B62M 9/121* (2013.01); *B62M 9/131* (2013.01);
(Continued)

(58) Field of Classification Search
CPC ...... B62M 25/08; B62M 9/121; B62M 9/131; B62M 9/122; B62M 9/132; B62M 2025/003; B62M 2025/006; H01H 5/02; B62K 23/06; B62K 23/02; B62J 2099/0013; B62J 2099/002; B62J 2099/004; B62L 3/02
See application file for complete search history.

(56) References Cited

U.S. PATENT DOCUMENTS 6,698,307 B2 * 3/2004 Wesling ................. B62M 25/08
280/260
6,698,567 B2 * 3/2004 Dal Pra' ................ B62M 25/04
192/217
(Continued)

FOREIGN PATENT DOCUMENTS

DE  202014105749 U1  2/2015
DE  202015103457 U1  11/2015
(Continued)

OTHER PUBLICATIONS

Italian Search Report and Written Opinion in Italian Application No. 102016000081324, dated May 12, 2017, with English translation.

*Primary Examiner* — Nimeshkumar D Patel
*Assistant Examiner* — Tania Courson
(74) *Attorney, Agent, or Firm* — Volpe and Koenig, P.C.

(57) ABSTRACT

A bicycle control device for issuing at least one command to at least one bicycle equipment comprises a body configured to be mounted on the bicycle, at least one manual actuation member associated with the body, and a clicking mechanism. The clicking mechanism comprises a magnetic clicking switch having a first element that is fixed with respect to the body, and a second element that is movable with respect to the first element and actuatable by said at least one manual actuation member when said manual actuation member issues said command.

15 Claims, 9 Drawing Sheets

(51) Int. Cl.

| | | |
|---|---|---|
| *B62K 23/06* | (2006.01) | |
| *B62M 9/121* | (2010.01) | |
| *B62M 9/131* | (2010.01) | |
| *B62K 23/02* | (2006.01) | |
| *B62J 45/00* | (2020.01) | |
| *B62J 45/20* | (2020.01) | |
| *B62J 45/40* | (2020.01) | |
| *B62L 3/02* | (2006.01) | |
| *B62M 9/122* | (2010.01) | |
| *B62M 9/132* | (2010.01) | |
| *B62M 25/00* | (2006.01) | |

(52) U.S. Cl.
CPC ............ *H01H 5/02* (2013.01); *B62J 45/00* (2020.02); *B62J 45/20* (2020.02); *B62J 45/40* (2020.02); *B62K 23/02* (2013.01); *B62L 3/02* (2013.01); *B62M 9/122* (2013.01); *B62M 9/132* (2013.01); *B62M 2025/003* (2013.01); *B62M 2025/006* (2013.01)

(56) References Cited

U.S. PATENT DOCUMENTS

| | | | | |
|---|---|---|---|---|
| 6,933,836 B2* | 8/2005 | Hsu | ............... | B60Q 1/2676 340/432 |
| 7,900,946 B2* | 3/2011 | Hara | ............... | B62M 9/122 280/260 |
| 7,966,903 B2* | 6/2011 | Kimura | ............... | F16H 63/3433 74/335 |
| 8,286,529 B2* | 10/2012 | Tetsuka | ............... | B60T 7/102 74/502.2 |
| 8,491,348 B2* | 7/2013 | Simard | ............... | B60K 26/02 440/41 |
| 8,655,561 B2 | 2/2014 | Kitamura | | |
| 8,909,424 B2* | 12/2014 | Jordan | ............... | B62M 9/132 701/36 |
| 8,955,863 B2 | 2/2015 | Kosaka et al. | | |
| 8,958,962 B2 | 2/2015 | Miki et al. | | |
| 9,056,651 B2 | 6/2015 | Tetsuka | | |
| 9,079,629 B2* | 7/2015 | Kosaka | ............... | B62M 25/08 |
| 9,145,183 B2 | 9/2015 | Kosaka et al. | | |
| 9,157,523 B2 | 10/2015 | Miki et al. | | |
| 9,159,507 B2 | 10/2015 | Mueller et al. | | |
| 9,287,063 B2 | 3/2016 | Mueller et al. | | |
| 9,690,318 B2* | 6/2017 | Bernardele | ............... | B62M 25/045 |
| 2001/0048211 A1* | 12/2001 | Campagnolo | ............... | B62M 9/122 280/261 |
| 2004/0138017 A1* | 7/2004 | Kitamura | ............... | B62M 9/122 474/82 |
| 2005/0099277 A1 | 5/2005 | Hsu | | |
| 2005/0187050 A1* | 8/2005 | Fukuda | ............... | B62M 9/122 474/80 |
| 2008/0210045 A1 | 9/2008 | De Perini et al. | | |
| 2009/0240858 A1* | 9/2009 | Takebayashi | ............... | B62M 25/08 710/110 |
| 2010/0186538 A1 | 7/2010 | Tetsuka | | |
| 2010/0244401 A1* | 9/2010 | Hara | ............... | B62M 9/122 280/261 |
| 2011/0035039 A1 | 2/2011 | Simard et al. | | |
| 2012/0255390 A1 | 10/2012 | Warren et al. | | |
| 2012/0322591 A1* | 12/2012 | Kitamura | ............... | B62J 6/06 474/80 |
| 2014/0144281 A1 | 5/2014 | Kosaka et al. | | |
| 2014/0208887 A1 | 7/2014 | Kosaka et al. | | |
| 2014/0208888 A1 | 7/2014 | Kosaka et al. | | |
| 2014/0208889 A1 | 7/2014 | Kosaka et al. | | |
| 2014/0224039 A1* | 8/2014 | Bjork | ............... | G01L 3/24 73/862.191 |
| 2014/0260752 A1 | 9/2014 | Mueller et al. | | |
| 2014/0298943 A1* | 10/2014 | Hashimoto | ............... | F16H 59/044 74/473.12 |
| 2014/0354038 A1 | 12/2014 | Kosaka et al. | | |
| 2014/0371953 A1 | 12/2014 | Miller et al. | | |
| 2015/0009019 A1 | 1/2015 | Watarai et al. | | |
| 2015/0226582 A1* | 8/2015 | Siraky | ............... | G01D 5/2013 324/207.15 |
| 2016/0257269 A1* | 9/2016 | Watarai | ............... | B62J 99/00 |
| 2016/0272277 A1* | 9/2016 | Hayslett | ............... | B62M 25/02 |
| 2016/0311491 A1* | 10/2016 | Watarai | ............... | B60L 15/20 |
| 2016/0339986 A1* | 11/2016 | Jordan | ............... | B62K 23/02 |
| 2018/0178881 A1* | 6/2018 | Miglioranza | ............... | B62M 9/132 |
| 2018/0180640 A1* | 6/2018 | Miglioranza | ............... | G01P 3/44 |
| 2018/0290714 A1* | 10/2018 | Fossato | ............... | B62M 9/132 |
| 2019/0367131 A1* | 12/2019 | Marangon | ............... | G06F 1/163 |

FOREIGN PATENT DOCUMENTS

| | | |
|---|---|---|
| DE | 102015112290 A1 | 2/2016 |
| EP | 1964762 A2 | 9/2008 |
| EP | 2399813 A1 | 12/2011 |
| EP | 2210804 B1 | 11/2013 |
| EP | 2778035 A1 | 9/2014 |
| EP | 2778036 A1 | 9/2014 |
| EP | 2856274 A1 | 4/2015 |
| WO | 2013/173932 A1 | 11/2013 |

* cited by examiner

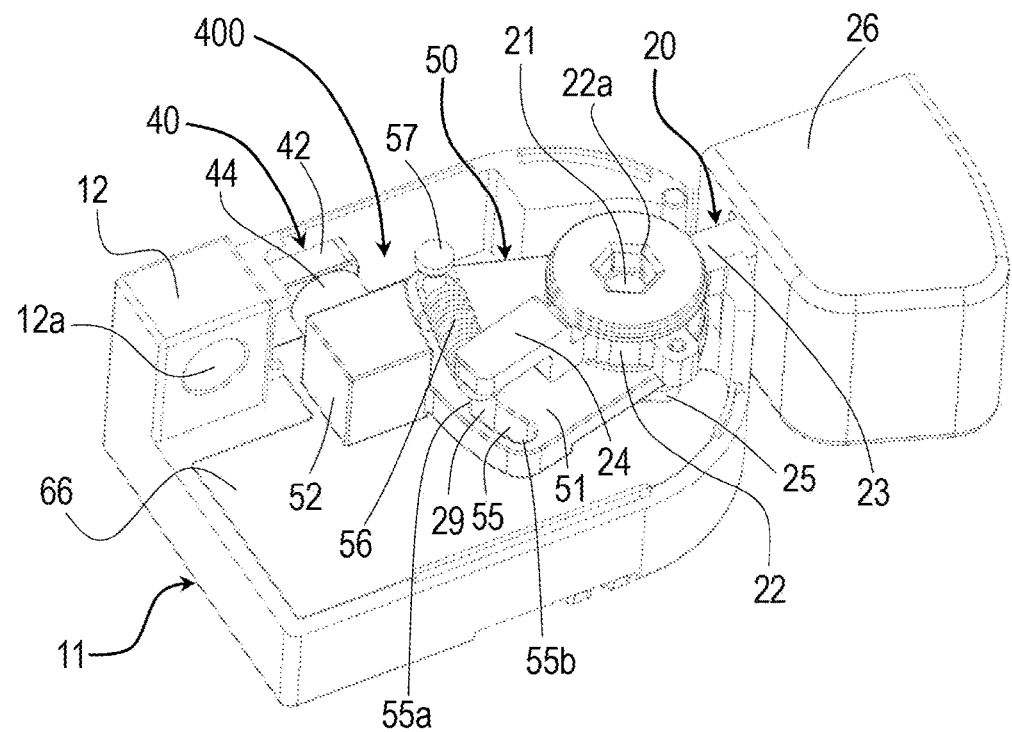
FIG. 3
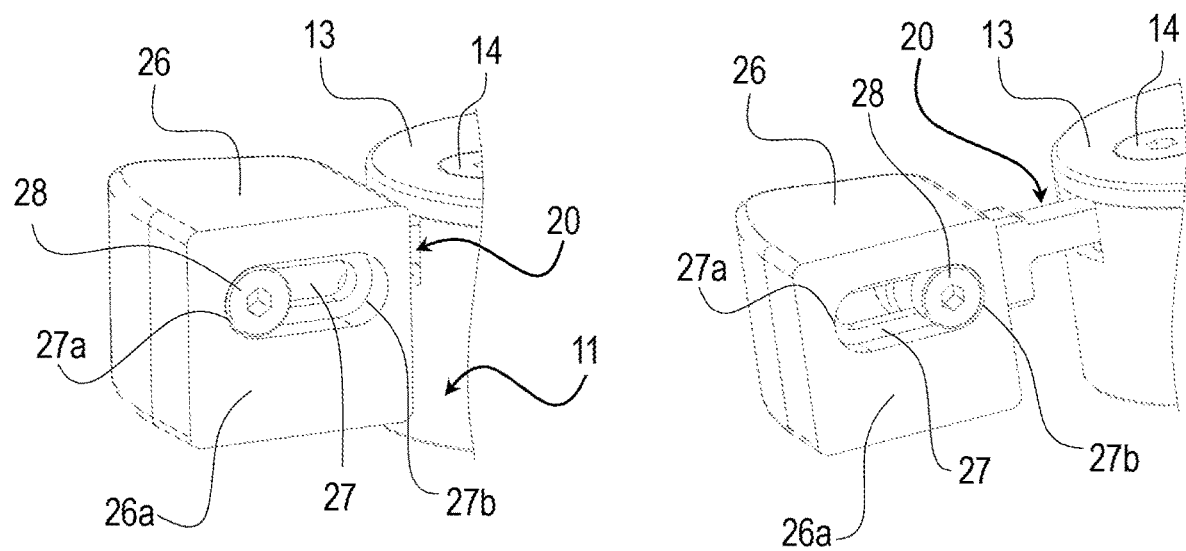
FIG. 4a
FIG. 4b

BICYCLE CONTROL DEVICE

CROSS REFERENCE TO RELATED APPLICATION

This application claims the benefit of Italian Application No. 102016000081324, filed on Aug. 2, 2016, which is incorporated herein by reference as if fully set forth.

FIELD OF INVENTION

The present invention relates to a bicycle control device. The present invention relates, more specifically, to a bicycle control device for imparting at least one command to at least one equipment of the bicycle, such as a derailleur (mechanical or electro-mechanical), a brake or a cycle computer, the control device being provided with a clicking mechanism.

BACKGROUND

Known bicycle control devices comprise a support body suitable for being fixed close to or at a handgrip portion of the bicycle handlebars and carrying one or more manual actuation members, of the lever type, namely actuated by a rotary movement, or of the button type, namely actuated with a linear movement, actuatable with a finger or with plural fingers to issue commands to bicycle pieces of equipment, such as a brake, a derailleur or a so-called cycle computer.

In the present description and in the attached claims, the expression "bicycle control device for issuing at least one command" or briefly "control device" shall refer to a control device capable of issuing one or more electrical-electronic and/or mechanical commands to one or more pieces of electrical-electronic and/or mechanical and/or pneumatic equipment of the bicycle, such as a derailleur, a brake, a cycle computer, and similar.

Bicycle control devices, provided with a so-called clicking mechanism, which has the purpose of providing the cyclist with a tactile and/or acoustic feeling of the successful actuation of a command, are known in the art.

US 2014/0208888 A1 discloses a bicycle control device comprising a base member, a first manual actuation member, a second manual actuation member, and a clicking mechanism. The base member is configured to be attached to the bicycle, and the first and second manual actuation members are movably supported on the base member between respective rest and operated positions. The clicking mechanism includes a first part configured to contact projections formed in the first or in the second actuation member as the first or the second actuation member moves from the rest position to the operated position, and a second part pivoted on the base member through a first pin. The first part is pivoted on the second part through a second pin. A first spring is arranged between the second part and the base member, and a second spring is arranged between the first part and the second part.

Upon actuation of the first or second actuation member, the first part of the clicking mechanism rotates about the first pin and contacts the protrusions of the first or second actuation member. Consequently, during such movement, the first part of the clicking mechanism remains stationary with respect to the second part, since such first and second parts rotate together with respect to the first pin.

Upon release of the first or second actuation member, the first part of the clicking mechanism rotates about the second pin. Consequently, during such movement, the first part moves with respect to the second part about the second pin.

EP 1 964 762 A2 discloses a control device for a bicycle comprising a brake lever to control a mechanical brake by means of a traction cable, a gearshifting lever, arranged behind the brake lever, to control an electro-mechanical derailleur in one direction, for example towards a toothed wheel having a larger diameter (upward gearshifting) and a pair of switches, one to control the electro-mechanical derailleur in a second direction, for example towards a toothed wheel having a smaller diameter (downward gearshifting), and the other one to input commands into a cycle computer.

The gearshifting lever and the buttons act on respective electro-mechanical switches, of the microswitch type, each including a dome-shaped deformable diaphragm. In order to switch the switches, an elastic actuation head, actuated by the respective lever or by the respective button, faces the deformable diaphragm in the rest condition of the lever or button, and acts by pushing on the deformable diaphragm in the actuation condition of the lever or button.

In particular, upon actuation of the lever or button, the elastic actuation head compresses and starts to exert a pressure onto the dome-shaped deformable diaphragm, which deforms. The deformation of the diaphragm generates a tactile feeling, which is transferred and felt by the cyclist's fingers resting upon the lever or button.

The technical problem at the basis of the present invention is that of increasing the tactile and/or acoustic feeling provided to the cyclist by the clicking mechanism of a control device.

SUMMARY

In a first aspect thereof, the invention relates to a bicycle control device for issuing at least one command to at least one equipment of the bicycle, comprising:
 a body configured to be mounted on the bicycle;
 at least one manual actuation member associated with the body; and
 a clicking mechanism.

The clicking mechanism of the control device comprises a magnetic clicking switch having a first element that is fixed with respect to the body, and a second element that is movable with respect to the first element and actuatable by said at least one manual actuation member when the manual actuation member issues the command.

The manual actuation member is actuated to move the second element, with respect to the first element, between a rest position, or idle position, of the clicking mechanism and an operating position, or actuation position, of the clicking mechanism.

In the rest position, the second element contacts the first element and, in the operating position, the second element is spaced apart from the first element, or vice-versa.

The Applicant has indeed recognized that the provision of a magnetic switch in the clicking mechanism allows the tactile and acoustic feeling generated by the clicking mechanism to be increased. Furthermore, the use of a magnetic clicking switch, instead of a conventional mechanical switch, for example based on teeth, contacts and similar mechanical elements, advantageously allows a clicking mechanism more wear-resistant and which requires less maintenance (for example, the use of lubrication is entirely absent) to be obtained.

Later on in the present description, and in the following claims, the terms upper, above, lower, below, front, in front of, rear and behind are used with spatial reference to the mounted condition of the control device on the handlebars of a bicycle.

Preferably, the clicking mechanism comprises a snapping device, the second element of the magnetic clicking switch being rigidly associated with the snapping device.

Alternatively, the second element of the magnetic switch can be rigidly associated with the manual actuation member.

Preferably, the manual actuation member is a lever comprising a driving arm and a driven arm, the snapping device comprising a plate-like element wherein an opening is formed for slidably housing a first pin associated with the driven arm of the lever.

In particular, the snapping device comprises a spring having one end associated with the first pin and the other end associated with a second pin associated with the plate-like element.

Preferably, the second element of the magnetic clicking switch is fixed to a support element formed as one piece with the plate-like element of the snapping device.

Alternatively, the support element of the second element of the magnetic clicking switch is a separate component, which is fixed onto the plate-like element of the snapping device.

Preferably, the lever and the plate-like element of the snapping device are pivoted on the body of the control device by means of a pin fixed to the body.

Preferably, the control device comprises a lever cover associated with the driving arm, the lever cover having a slot for receiving a fixing screw for adjusting the lever cover on the lever.

In another embodiment, the at least one manual actuation member issues a mechanical command, for example by means of a traction cable, typically a Bowden cable.

Preferably, the control device comprises a control switch that can be switched through the actuation of the at least one manual actuation member and suitable for generating, in response thereto, a signal to issue the command.

Preferably, the control switch is a magnetic control switch comprising a magnetic sensor mounted at or a suitable distance from the second element of the magnetic clicking switch of the clicking mechanism.

Alternatively, the control switch can be of the electrical type, preferably of the membrane type.

Preferably, the magnetic sensor of the magnetic control switch is suitable for detecting a variation of the magnetic field generated by the magnetic clicking switch.

Alternatively, the magnetic sensor of the magnetic control switch can detect the absence/presence of the magnetic field generated by the magnetic clicking switch.

According to another embodiment, the magnetic sensor of the magnetic control switch is a sensor sensitive to only one polarity of the first or second element of the magnetic clicking switch, preferably of the second element of the magnetic clicking switch.

Alternatively, the magnetic control switch comprises a third element that is fixed with respect to the body, and a fourth element that is movable with respect to the third element and actuatable by said at least one manual actuation member when said manual actuation member issues said command.

Preferably, the third element is a magnetic sensor mounted on the body of the control device, and the fourth element is a magnet mounted on the plate-like element, or vice-versa.

Preferably, the magnetic sensor of the magnetic control switch is mounted on the body of the control device, and the magnet of the magnetic control switch is mounted on the plate-like element.

Preferably, the control device comprises an electronic communication unit, preferably of the wireless type, configured to receive the signal to issue the command generated by the control switch and to control, in response thereto, the at least one equipment of the bicycle.

Preferably, the control switch and the electronic communication unit are integrated on a printed circuit board.

Preferably, the magnetic sensor of the magnetic control switch is in communication with the electronic communication unit of the control device.

Preferably, the control device further comprises a first seat for housing the magnetic clicking switch, and a second seat, separate from the first seat, for housing the electronic communication unit.

Preferably, the second housing seat comprises a sealed chamber for containing the electronic communication unit.

Preferably, the sealed chamber is defined by the body and by a protective lid that is tight sealed, in particular by means of a sealing resin.

Preferably, the control device comprises an auxiliary magnetic switch preferably comprising an auxiliary magnetic sensor and an auxiliary magnet.

Preferably, the auxiliary magnetic sensor of the auxiliary magnetic switch is in communication with the electronic communication unit of the control device.

Preferably, the auxiliary magnet of the auxiliary magnetic switch is mounted outside of the body of the control device, movable with respect to the body according to a button-type movement.

Alternatively, the auxiliary magnet of the auxiliary magnetic switch is a component external to the control device, and which can be coupled, by force-fit or by contact, with the control device so as to be detected by said auxiliary magnetic sensor.

Preferably, the control device comprises power supply means, which consist, in particular, of at least one battery received in a seat formed in the body of the control device, preferably said seat being closed by a cap.

Preferably, the power supply means supply power to the electronic communication unit.

Preferably, the control device further comprises light signaling means of an operating condition of the manual actuation member and/or of the bicycle equipment.

Preferably, the light signaling means consist of an LED.

Alternatively, the light signaling means are in communication with the electronic communication unit of the control device.

Preferably, the at least one equipment of the bicycle is selected from the group consisting of a mechanical or electro-mechanical derailleur, a cycle computer and a brake.

Preferably, the first element of the magnetic clicking switch is one of a magnet or an element made of a metal capable of being attracted by a magnet, typically iron, but also other types of metal, for example nickel, cobalt, chromium and alloys and compounds of these metals, while the second element of the magnetic clicking switch is the other one of an element made of a metal capable of being attracted by a magnet, typically iron, but also other types of metal, for example nickel, cobalt, chromium and alloys and compounds of these metals or a magnet.

Alternatively, the first and the second element of the magnetic clicking switch are two magnets with opposite poles facing each other. Such a technical solution features, advantageously, a greater strength against interference.

BRIEF DESCRIPTION OF THE DRAWING(S)

Further features and advantages of the present invention will become more apparent from the following detailed description of some preferred embodiments of a bicycle control device according to the invention, made hereinafter by way of indicative and non-limiting example with reference to the attached drawings. In the drawings:

FIG. 3 is a perspective view of the control device of FIG. 1, with a cover removed to better highlight some internal components of the control device;

FIGS. 4a and 4b are partial perspective and enlarged rear views of FIG. 1, which show a lever cover of the control device of FIG. 1, in two different operating positions;

DETAILED DESCRIPTION OF THE PREFERRED EMBODIMENTS

Figure 1:
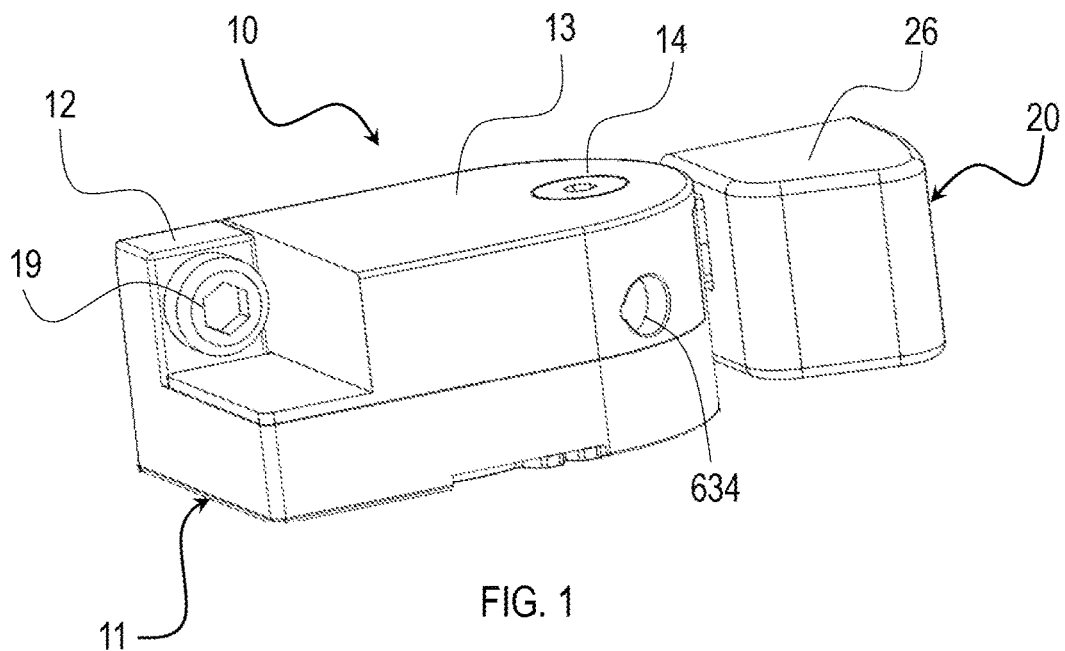
FIG. 1 is a perspective view, which shows a preferred embodiment of the bicycle control device according to the invention.

In the following description, to illustrate the figures identical or similar reference numerals are used to indicate constructive elements having the same function or an analogous function.

FIG. 1 illustrates an embodiment of a bicycle control device according to the invention, globally indicated with reference numeral 10.

The control device 10 comprises a body 11, provided with an element 12 for fixing the control device 10 to a bicycle, and a cover 13, coupled with the body 11 through any fixing means, in the example of FIG. 1 a screw 14. Of course, it is possible to provide for a irremovably fixed cover or for a device without a cover.

Figure 2:
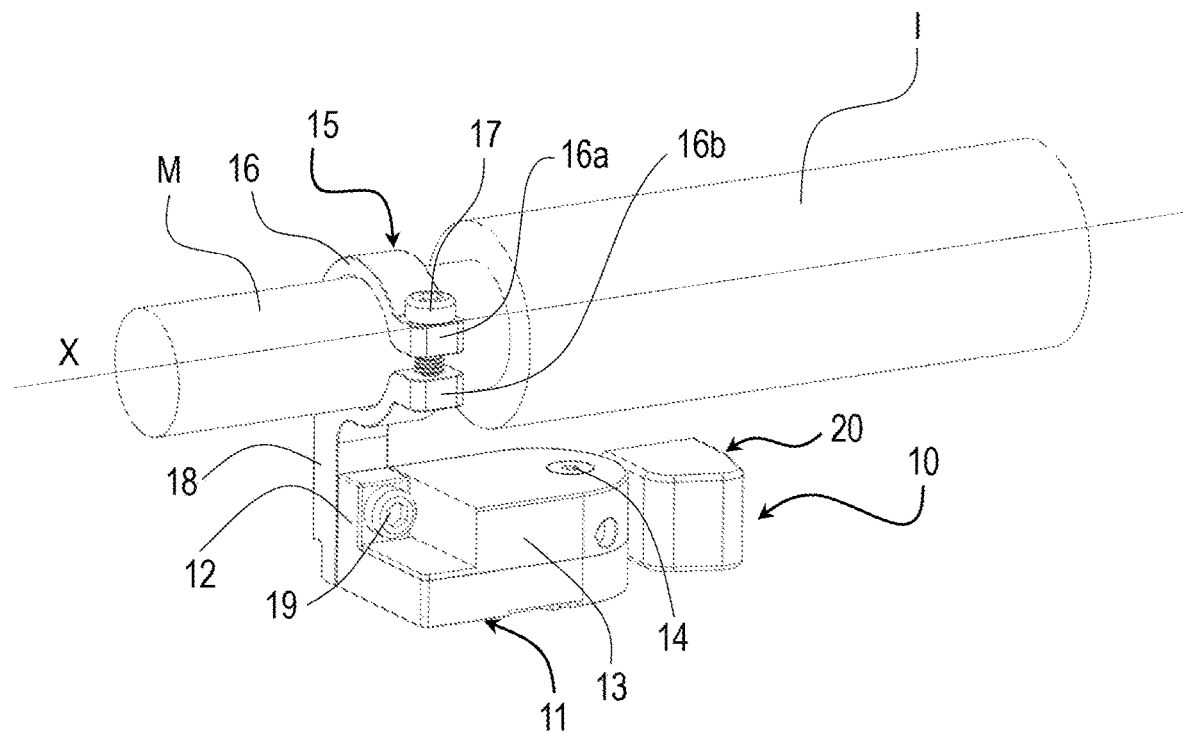
FIG. 2 is a perspective view, which shows the control device of FIG. 1 mounted at a handgrip of a bicycle handlebars.

As shown in detail in FIG. 2, the control device 10 is preferably mounted at a handgrip I of the bicycle handlebars M through any mounting means, in the illustrated example a strap 15. The control device 10 can also be of the bar-end type. Instead of on the handlebars M, the control can, alternatively, be fixed in other positions on the bicycle frame, for example at a bottle holder.

In particular, the strap 15 comprises an open loop portion 16 and an elongated portion 18, extending downwards from the open loop portion 16, on which at least one control device 10 is fixed. In mounted position on the strap 15, each control device 10 extends parallel to a longitudinal axis X of the handlebars M.

In particular, the control device 10 is fixed to the strap 15 by means of a screw 19 that passes through a hole 12a (shown in FIG. 3) formed in the fixing element 12 of the body 11.

The open loop portion 16 is configured to be slid onto the handlebars M, or alternatively onto a different portion of the bicycle frame, and then fixed through known fixing means, in the illustrated example a screw 17 for locking ends 16a, 16b of the loop facing each other.

In order for the cyclist to input commands, the illustrated control device 10 comprises at least one manual actuation member, herein a lever 20, which is supported by the body 11, movable between a rest position and an operating position. Alternatively, the manual actuation member can be of the button type.

It is possible to provide for the mounting, through a respective strap 15, of a single control device 10 on the right and of a single control device 10 on the left. In that case, the control device 10 mounted on the left can be substantially to the mirror image of the control device 10 mounted on the right.

In an alternative embodiment, not illustrated in the figures, it is possible to provide for a pair of control devices 10 fixed on the same strap 15, on the same side or on opposite sides of the elongated portion 18. In that case, a control device 10 can be actuated by one of the cyclist's fingers, for example by exerting a pressure onto the manual actuation member 20, while the other control device 10 can be actuated by another of the cyclist's fingers, for example by exerting a traction onto the manual actuation member 20.

As an example, one control device 10 can control the upward gearshifting of a rear derailleur of the bicycle, while another control device 10 can control the downward gearshifting of the rear derailleur.

Figure 5:
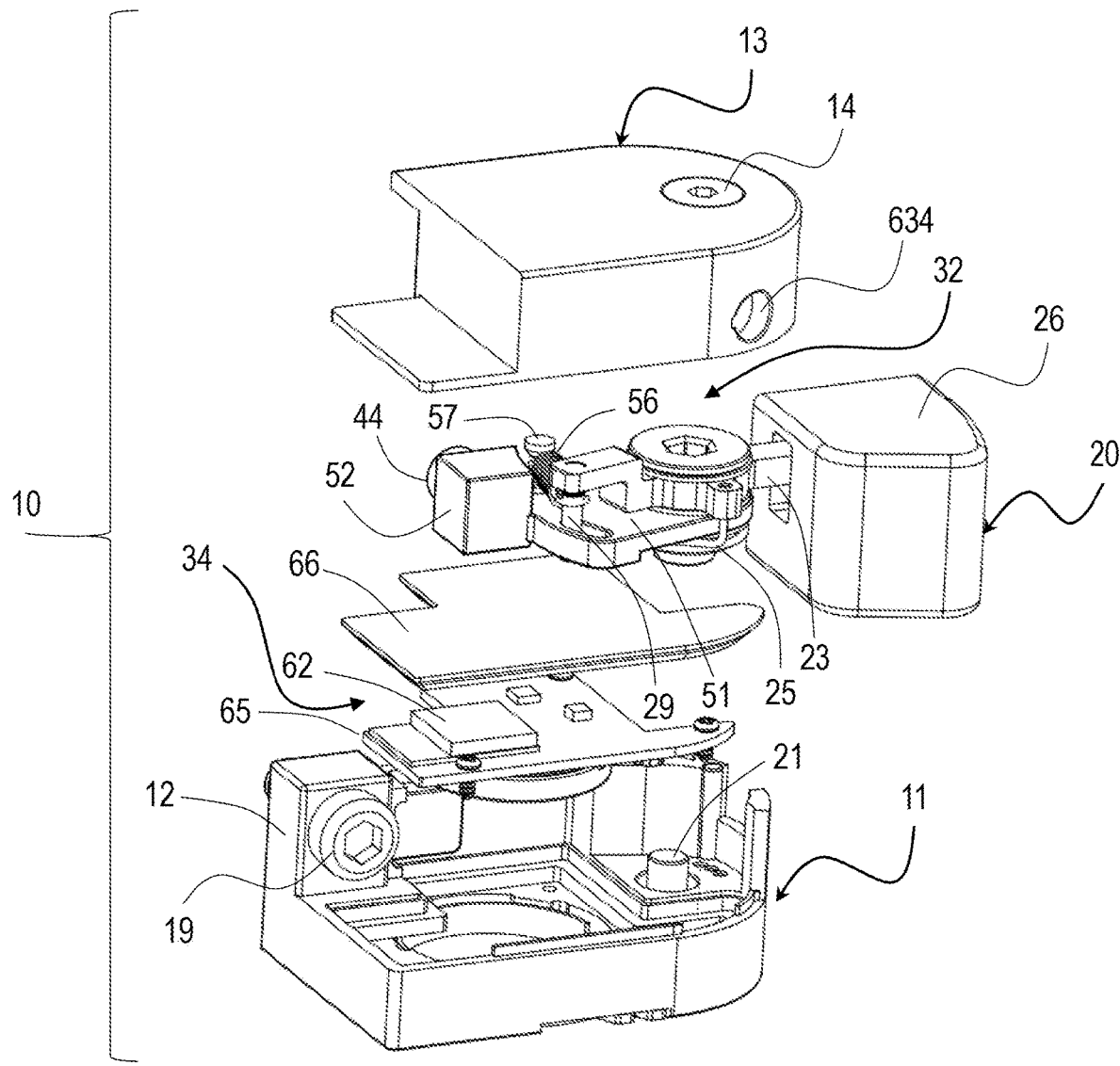
FIG. 5 is an exploded perspective view of the control device of FIG. 1.

As shown in detail in FIGS. 3 and 5, the lever 20 is pivoted on the body 11 of the control device 10 through a pivot pin 21, fixed to the body 11.

A return spring 25 is operatively interposed between the lever 20 and the body 11 at the pivot pin 21 to keep the lever 20 pushed towards the rest position.

In particular, the lever 20 comprises a central body 22 for being pivoted to the pin 21, a driving arm 23 and a driven arm 24, which extend from the central body 22, preferably at diametrically opposite positions of the central body 22. In particular, the driving arm 23 extends from the central body 22 outside of the body 11, while the driven arm 24 extends from the central body 22 within the body 11. In the central body 22 of the lever 20, a hole 22a is also formed for receiving the screw 14 for fixing the cover 13 onto the body 11.

On the driving arm 23 of the lever 20, a lever cover 26 is also mounted, configured so as to facilitate the actuation of the lever 20 by a cyclist.

As shown in detail in FIGS. 4a and 4b, the lever cover 26 has, preferably at a rear face 26a thereof, a preferably horizontal slot 27, suitable for receiving a screw 28 for fixing the lever cover 26 on the lever 20. The slot 27 advantageously allows the mounting position of the lever cover 26 on the lever 20 to be adjusted along a longitudinal axis of the lever 20, so as to adapt the lever 20 to the size of the cyclist's hand. In particular, the position of the lever cover 26 is adjustable between a retracted position or position of minimum distance from the body 11, shown in FIG. 4a, wherein the screw 28 abuts against an end 27a of the slot 27, and an extended position or position of maximum distance from the body 11, shown in FIG. 4b, wherein the screw 28 abuts against the other end 27b of the slot 27.

Going back to FIGS. 3 and 5, at a free end of the driven arm 24 of the lever 20, a first pin 29 is fitted, the function of which will become clearer hereinafter.

In the body 11 of the control device 10, a clicking mechanism 400 is also housed, which comprises a magnetic clicking switch 40.

In particular, the magnetic clicking switch 40 comprises a first element 42 and a second element 44. The first element is fixed onto the body 11 of the control device 10, while the second element 44 is movable with respect to the first element 42. In particular, the lever 20 actuates the second element 44, displacing it with respect to the first element 42, when it issues the command to the bicycle equipment.

Alternatively, the first element 42 can be fixed to the cover 13 for closing the body 11.

In particular, the first element 42 and the second element 44 of the magnetic clicking switch 40 cooperate so that, when the cyclist actuates the lever 20 to issue the command, the second element 44 moves, with respect to the first element 42, between a rest position, or idle position, of the clicking mechanism 400, and an operating position, or actuation position, of the clicking mechanism 400.

In particular, in the rest position, the second element 44 contacts the first element and, in the operating position, the second element 44 is spaced apart from the first element 42. As better described below, the reverse is also possible.

The first element 42 of the magnetic clicking switch 40 is an element made of a metal that can be attracted by a magnet, typically iron, but also other types of metal, for example nickel, cobalt, chromium and alloys and compounds of these metals, while the second element 44 of the magnetic clicking switch 40 is a magnet.

Alternatively, the first element 42 of the magnetic clicking switch 40 is a magnet, while the second element 44 of the magnetic switch is an element made of a metal capable of being attracted by a magnet, typically iron, but also other types of metal, for example nickel, cobalt, chromium and alloys and compounds of these metals.

In yet another alternative, the first element 42 and the second element 44 of the magnetic clicking switch 40 are two magnets having opposite poles facing each other.

The clicking mechanism 400 further comprises a snapping device 50 suitable for cooperating with the lever 20 to actuate the clicking mechanism 400.

In particular, the snapping device 50 comprises a snapping element 51 for supporting the second element 44 of the magnetic clicking switch 40.

In the embodiment illustrated in the figures, the second element 44 of the magnetic clicking switch 40 is fixed, for example screwed or welded, to a support body 52 made as one piece with the snapping element 51. However, without departing from the scope of protection of the present invention, the support body 52 of the second element 44 of the magnetic clicking switch 40 can be a separate component, for example a magnet-holding arm, which is fixed, for example screwed or welded, onto the snapping element 51 of the snapping device 50.

The snapping element 51, preferably plate-like, is hinged to the pivot pin 21 of the lever 20, right below the lever 20, and has a slot 55 for slidably housing the first pin 29 of the lever 20.

Preferably, the slot 55 is formed at an edge portion of the snapping element 51 opposite to that where the snapping element 51 is pivoted onto the pin 21.

The snapping device 50 further comprises a spring 56 having an end associated with the first pin 29 of the lever 20, and the other end associated with a second pin 57 fitted onto the snapping element 51.

Preferably, the second pin 57 extends from an upper surface of the snapping element 51 at the edge portion of the snapping element 51 wherein the slot 55 is formed, a suitable distance from the slot 55.

Figure 6:
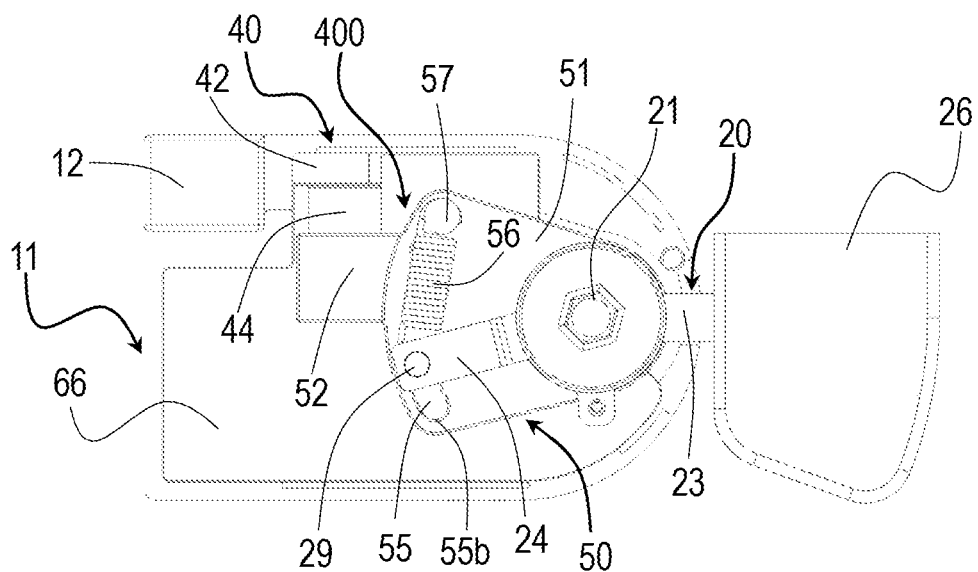
FIGS. 6-8 are plan views, with the cover removed, of the control device of FIG. 1, which show the operation of the clicking mechanism.
Figure 7:
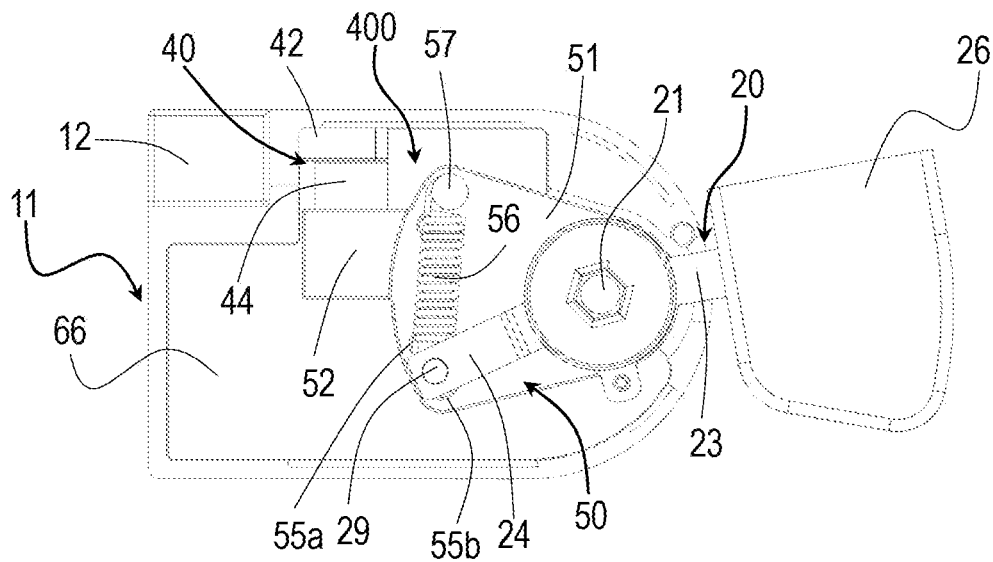
Figure 8:
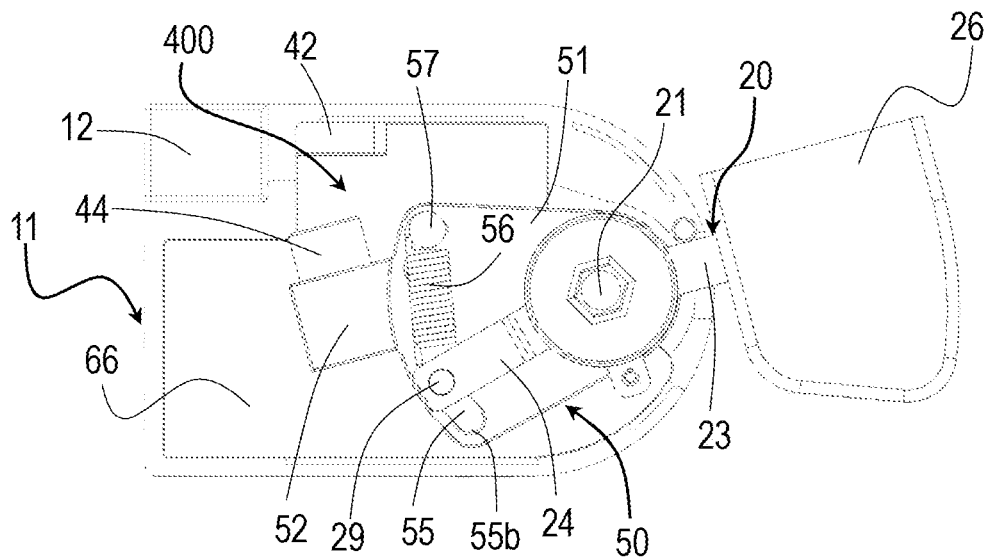

With reference to FIGS. 6 to 8, the operation of the clicking mechanism 400 of the control device 10 described above will now be described.

In the rest position of the lever 20, shown in FIG. 6, the clicking mechanism 400 is in its inactive position.

In such a position, the first element 42 and the second element 44 of the magnetic clicking switch 40 are kept in contact by the magnetic attraction force, and hold the snapping element 51 of the snapping device 50 in position. Furthermore, the first pin 29 of the lever 20 abuts against a first end 55a (the one at the top, labelled in FIG. 7) of the slot 55.

When the lever 20 is actuated by the cyclist, for example to command upward gearshifting of the rear derailleur of the bicycle, there is a rotation of the lever 20 about the pivot pin 21, and the pin 29, fitted on the driven arm 24 of the lever 20, slides along the slot 55 of the snapping element 51, in the direction towards the second end 55b of the slot 55. Such an operating condition of the clicking mechanism 400 is shown in FIG. 7.

During the initial sliding step of the first pin 29 within the slot 55, the snapping element 51 stays still, held in position by the magnetic attraction force between the first element 42 and the second element 44 of the magnetic clicking switch 40. As a consequence, the spring 56 connected between the first pin 29 of the lever 20 and the second pin 57 of the snapping element 51 stretches, and is loaded by the movement of the first pin 29 within the slot 55.

When the elastic loading force of the spring 56 exceeds the magnetic attraction force between the first element 42 and the second element 44 of the magnetic clicking switch 40, the second element 44 moves away from the first element 42, releasing the snapping element 51, which is therefore free to rotate about the pivot pin 21.

The released snapping element 51 is therefore pulled back by the spring 56, with consequent sudden contact of the first pin 29 against the first end 55a of the slot 55 and generation of the tactile and acoustic feeling for the cyclist. Such an operating condition of the clicking mechanism 400 is shown in FIG. 8.

It should be noted that, in normal operating conditions of the clicking mechanism 400, the elastic characteristics of the spring 56 are such that the moving of the second element 44 away from the first element 42 of the magnetic switch 40 takes place before the first pin 29 of the lever 20 abuts against the second end 55b of the slot 55.

The clicking mechanism 400 is, however, configured so as to operate also in case of changes of such elastic characteristics of the spring 56, typically due to wear. In this case, indeed, the first pin 29 would abut against the second end 55b of the slot 55, pulling the snapping element 51 therewith, progressively as the lever 20 is actuated, with consequent moving of the second element 44 away from the first element 42 of the magnetic switch 40. As a result, the correct operation of the clicking mechanism 400 is not influenced by malfunction or yielding of the spring 56.

Once the lever 20 has been released, it returns back in the rest position of FIG. 6 together with the snapping element, with consequent abutment of the second element 44 against the first element 42 of the magnetic switch 40. This, advantageously, generates an acoustic feeling additional to that produced by the abutment of the first pin 29 of the lever 20 against the first end 55*a* of the slot 55.

The return into the rest condition is preferably facilitated by the presence of the return spring 25 (see for example FIG. 3). Alternatively, the return spring 25 could be omitted, in which case the magnetic attraction force of the magnetic clicking switch 40 will be such as to bring the second element 44 back into contact with the first element 42.

It should be noted that a small oscillation of the lever 20, caused for example by bumps or vibrations, is not sufficient to make the magnetic clicking switch 40 trigger.

Of course, it is possible to provide for a configuration wherein, in the rest condition of the lever 20, the second element 44 of the magnetic switch is spaced apart from the first element 42 of the magnetic switch and wherein, upon actuation of the lever 20 to issue the signal, the second element 44 comes into contact with the first element 42, with a consequent generation of the tactile and acoustic feeling for the cyclist.

Figure 9:
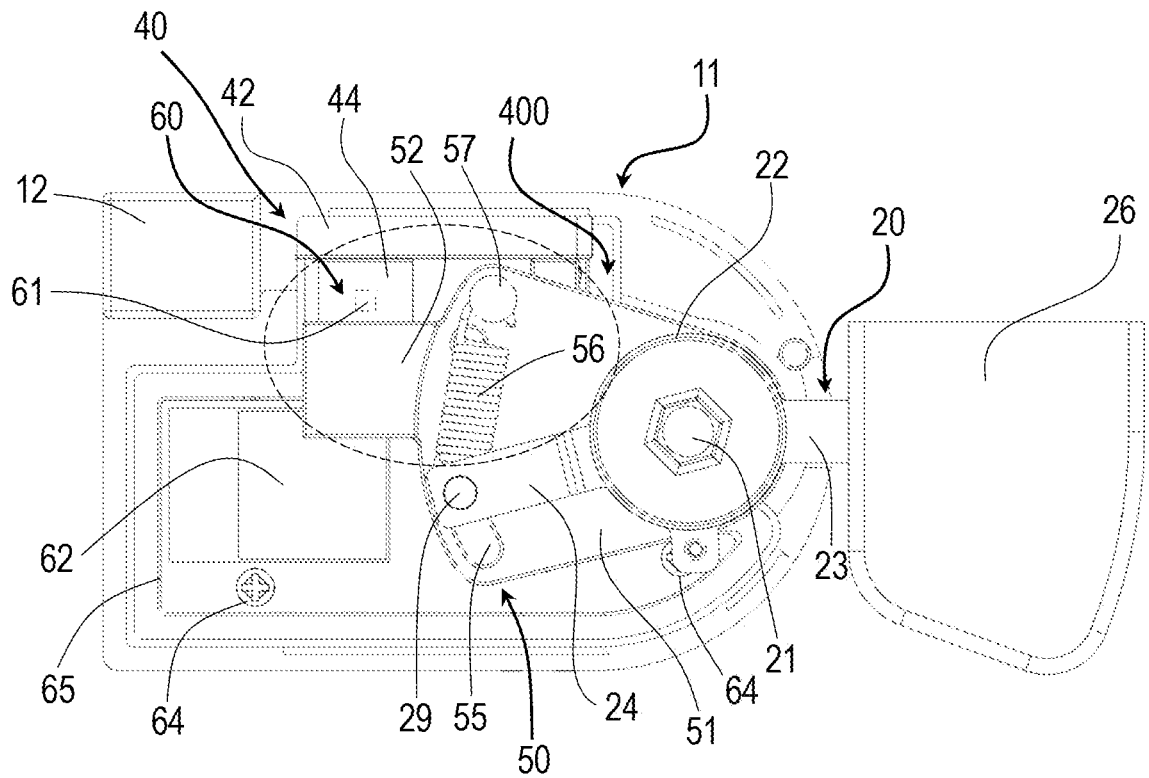
FIGS. 9 and 10 are plan views, similar to those of FIGS. 6-8, which show in detail a first embodiment of a magnetic control switch of the control device of the invention, in two different operating conditions of the control device.
Figure 10:
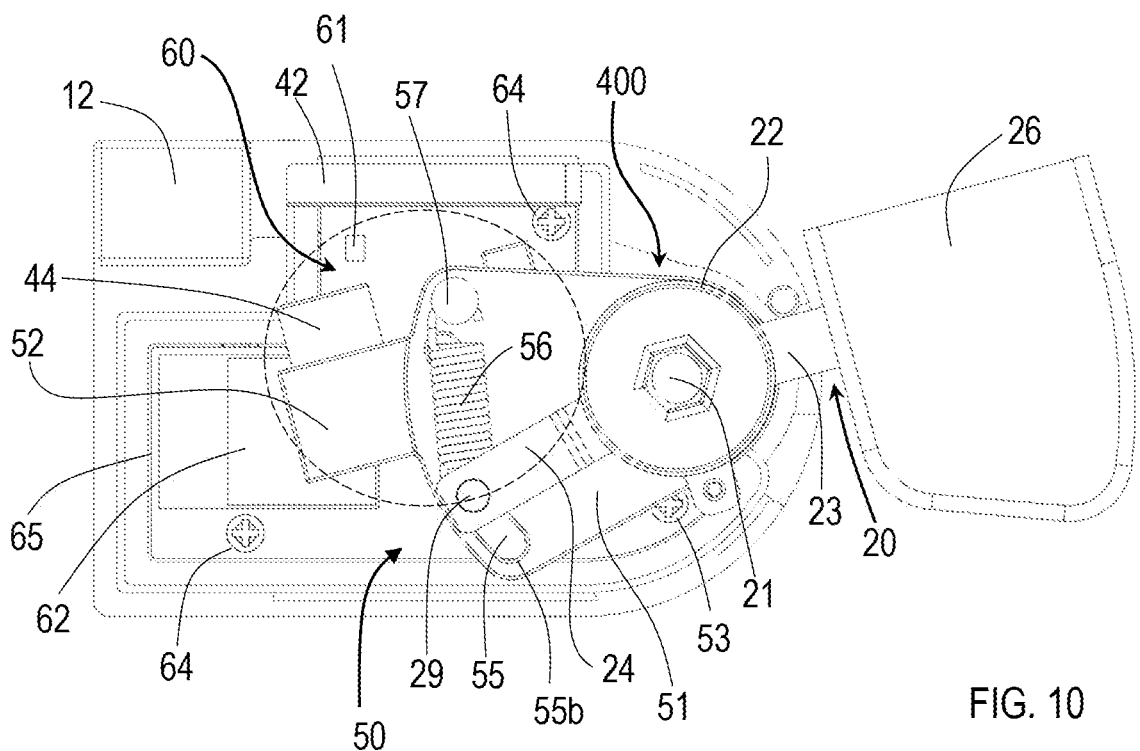

As shown in greater detail in FIGS. 9 and 10, the control device 10 further comprises a control switch 60 configured to detect the actuation of the lever 20 by the cyclist and to generate a control signal of the bicycle component to be controlled with the control device 10.

Figure 11:
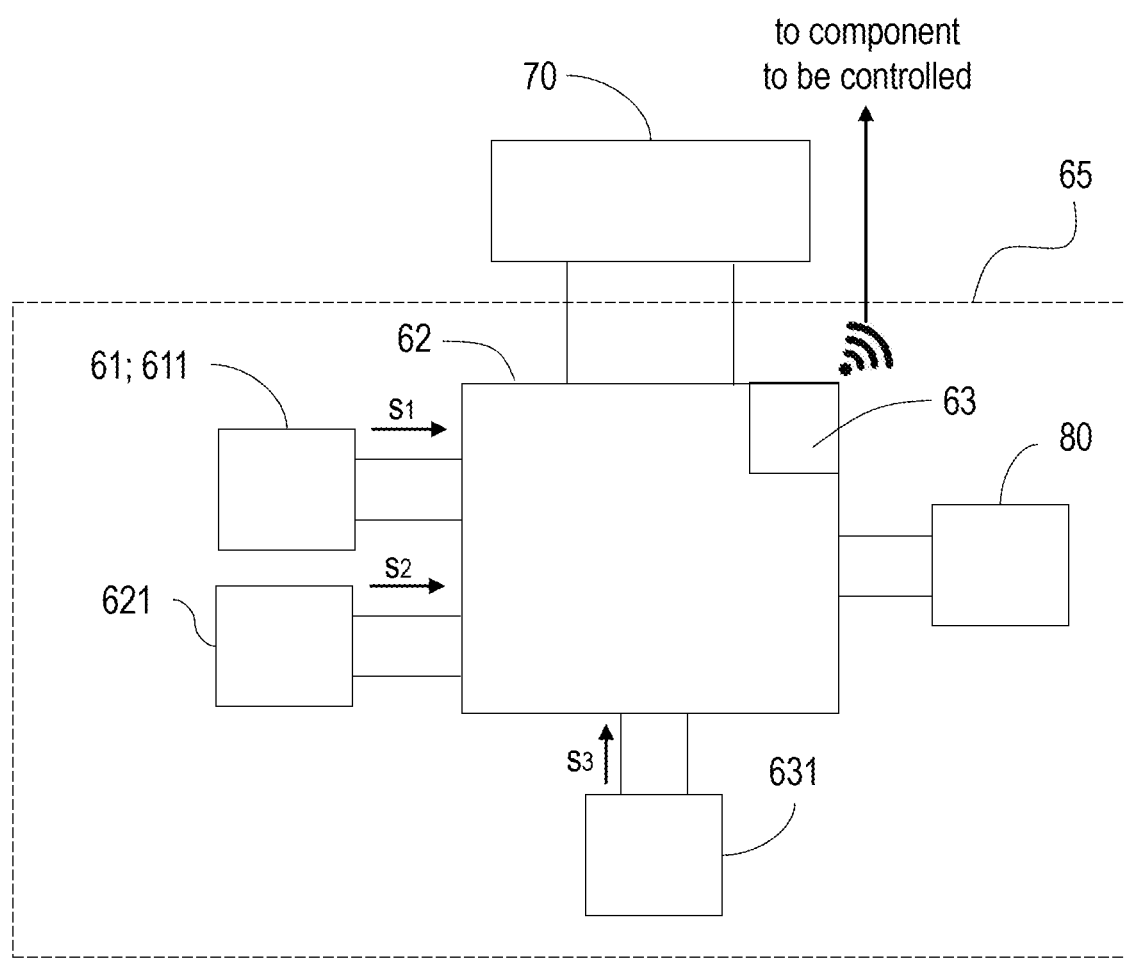
FIG. 11 is a block diagram of the electronic components of the control device of the invention.

With reference also to FIG. 11, the control switch 60 comprises a magnetic sensor 61 suitable for detecting the movement of the second element 44 of the magnetic clicking switch 40 with respect to the first element 42, and for generating a signal for issuing a command or control signal s1.

The magnetic sensor 61 is in communication, in a wired or wireless manner, with an electronic communication unit 62, which receives the control signal s1 generated by the sensor 61, processes it and transmits it to the bicycle component to be controlled. Preferably, the signal is transmitted in a wireless manner, and in this case the electronic communication unit 62 is provided with a wireless transmitter 63. Alternatively, the magnetic sensor 61 can be connected directly, by an electric wire or wireless, to the bicycle equipment or component to be controlled.

In order to control the bicycle equipment there can also be, instead of a magnetic switch, any switch suitable for the purpose, for example an electric switch, preferably of the membrane type, connected in a wired or wireless manner to electrical or electro-mechanical bicycle equipment, or a control mechanism of the traction cable type, for example a Bowden cable, in the case of mechanical and/or pneumatic bicycle equipment.

The magnetic sensor 61 and the electronic communication unit 62 are preferably integrated on a printed circuit board 65, which is mounted on the body 11 of the control device 10, for example through screws 64.

The printed circuit board 65 is protected by a lid 66, for example visible in FIGS. 3 and 5, which is fixed, preferably glued or ultrasound welded, onto the body 11 of the control device 10. The lid 66 is preferably made of fiberglass or plastic materials.

As a result, as shown in FIG. 5, in the control device 10 according to the invention two mutually separate seats are defined, namely a first seat 32, arranged above the lid 66, and a second seat 34, arranged below the lid 66.

Preferably, the first seat 32 is defined by the lid 66 and by the cover 13, while the second seat 34 is defined by the body 11 and by the lid 66.

In particular, in the first seat 32 the non-electronic components—i.e. the mechanical and magnetic ones—of the control device 10 are housed, namely the magnetic clicking switch 40, the snapping device 50, and the driven arm 24 of the lever 20. In the second seat 34 the electronic components of the control device 10 are housed, namely the electronic communication unit 62, and the control switch 60.

In this way, a physical separation is advantageously obtained between the electronic and non-electronic components of the control device 10. Furthermore, such a physical separation between electronic and non-electronic parts allows the maintenance of the control device 10 to be simplified, for example allowing interventions, in the case of failure, only on the part involved.

In particular, the second seat 34 consists of a sealed chamber, so that the electronic components are protected against dust and water, preferably providing an IP67 or IP69K degree of protection.

As shown in FIG. 9, the magnetic sensor 61 is so mounted on the printed circuit board 65 as to face the second element 44 of the magnetic clicking switch 40 when the lever 20 is in rest position, and distant or uncovered from the second magnetic element 44, when the lever 20 is fully actuated, with a consequent generation of the command.

In this embodiment, the first element 42 of the magnetic clicking switch 40 is elongated, and the second element 44 of the magnetic clicking switch 40 is C-shaped, so as to form, with the first elongated element 42, a preferential magnetic circuit indicated by the dashed circle in FIGS. 9 and 10. More specifically, the first elongated element 42 is made of a ferromagnetic material and the second C-shaped element 44 is a magnet.

When the clicking mechanism 400 is inactive, i.e. when the first element 42 and the second element 44 of the magnetic clicking switch 40 are in contact with each other (FIG. 9), the preferential magnetic circuit is closed, with the magnetic field lines mainly conveyed internally thereof. In this operating condition, the magnetic field detected by the magnetic sensor 61 is less than a predetermined threshold value.

Upon actuation of the clicking mechanism 400, when the second element 44 moves away from the first element 42, the preferential magnetic circuit opens, and the magnetic field lines close partially also in air (FIG. 10).

The magnetic sensor 61 detects the change in magnetic field, and generates the control signal s1, which is transmitted, directly or through the electronic communication unit 62, to the component or equipment of the bicycle to be controlled.

Alternatively, the transmission of the control signal s1 can also take place with a predetermined time delay with respect to the detection by the magnetic sensor 61. This, advantageously, allows the electronic communication unit 62 to abort the generation and transmission of the command, for example if the cyclist has actuated the lever 20 inadvertently or by mistake, and then releases it immediately.

Alternatively, the magnetic sensor 61 can be so mounted on the printed circuit board 65 as to be such a distance from the magnetic clicking switch 40 as not to detect the magnetic field generated thereby when the lever 20 is in the rest position.

In this case, when the lever 20 is actuated, and the second element 44 of the magnetic clicking switch 40 moves away from the first element 42 of the magnetic clicking switch 40, the second element 44 approaches the magnetic sensor 61. The magnetic sensor 61 detects the presence of the magnetic field and generates, in real time or with a predetermined delay, a control signal, which is transmitted, directly or through the electronic communication unit 62, to the bicycle component to be controlled.

Figure 12:
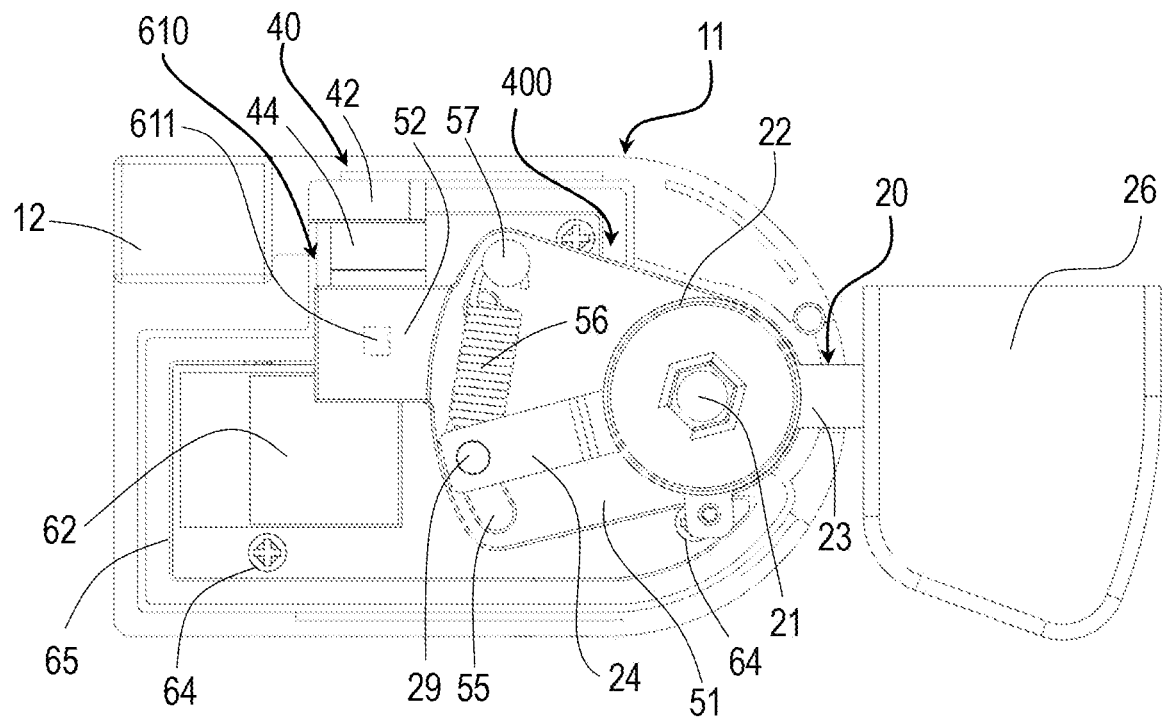
FIGS. 12 and 13 are views similar to those of FIGS. 9 and 10, which show in detail a second embodiment of a magnetic control switch of the control device of the invention, in two different operating conditions of the control device.
Figure 13:
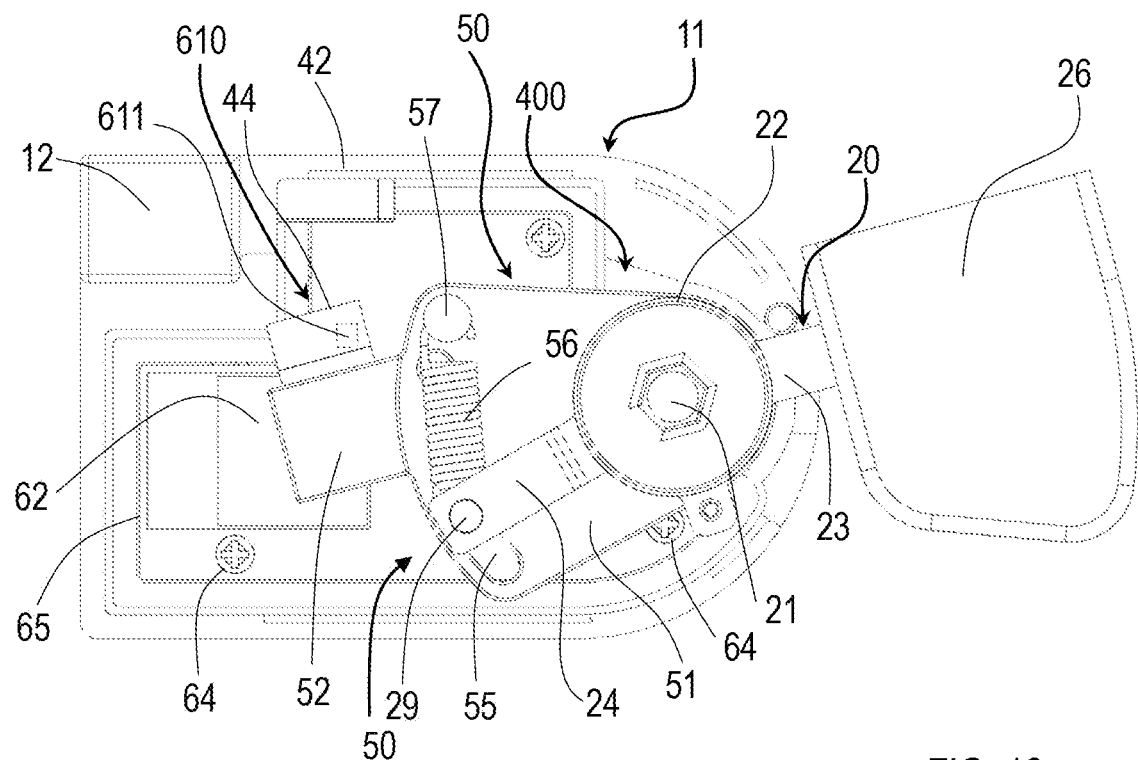

FIGS. 12 and 13 show a second embodiment of a magnetic control switch, generally indicated with reference numeral 610, configured to detect the actuation of the lever 20 by the cyclist, and generate a corresponding control signal.

With reference, again, to FIG. 11, such a magnetic control switch 610 comprises a magnetic sensor 611 suitable for detecting the movement of the second element 44 of the magnetic clicking switch 40 with respect to the first element 42, and for generating a corresponding control signal s1.

The magnetic sensor 611 is in communication, in a cabled or wireless manner, with the electronic communication unit 62, which receives the control signal s1 generated by the magnetic sensor 611, processes it and transmits it, through the wireless transmitter 63, to the bicycle component to be controlled. Alternatively, the magnetic sensor 611 can be connected directly, by electric wire or wireless, to the component of the bicycle to be controlled.

In particular, the magnetic sensor 611 is sensitive to only one of the two poles (north pole or south pole) of the second element 44 of the magnetic clicking switch 40.

As shown in detail in FIG. 12, the magnetic sensor 611 is so mounted on the printed circuit board 65, as to result, in the rest position of the lever 20, to be facing a pole, for example the north pole, of the second element 44 of the magnetic clicking switch 40 to which it is not sensitive.

When the magnetic clicking switch 40 is actuated, and the second element 44 moves away from the first element 42, the magnetic sensor 611 is exposed to the pole of the second element 44 of the magnetic clicking switch 40, for example the south pole, to which it is sensitive, and generates, in real time or after a predetermined delay, the control signal s1, which is transmitted, directly or through the electronic communication unit 62, to the bicycle component to be controlled.

Alternatively, it is possible for the first element 42 of the magnetic clicking switch 40 to be a magnet, in which case the second element 44 of the magnetic clicking switch 40 will be sensitive to only one of the two poles (north pole or south pole) of the first element 42, and will be moved by the lever 20.

Figure 14:
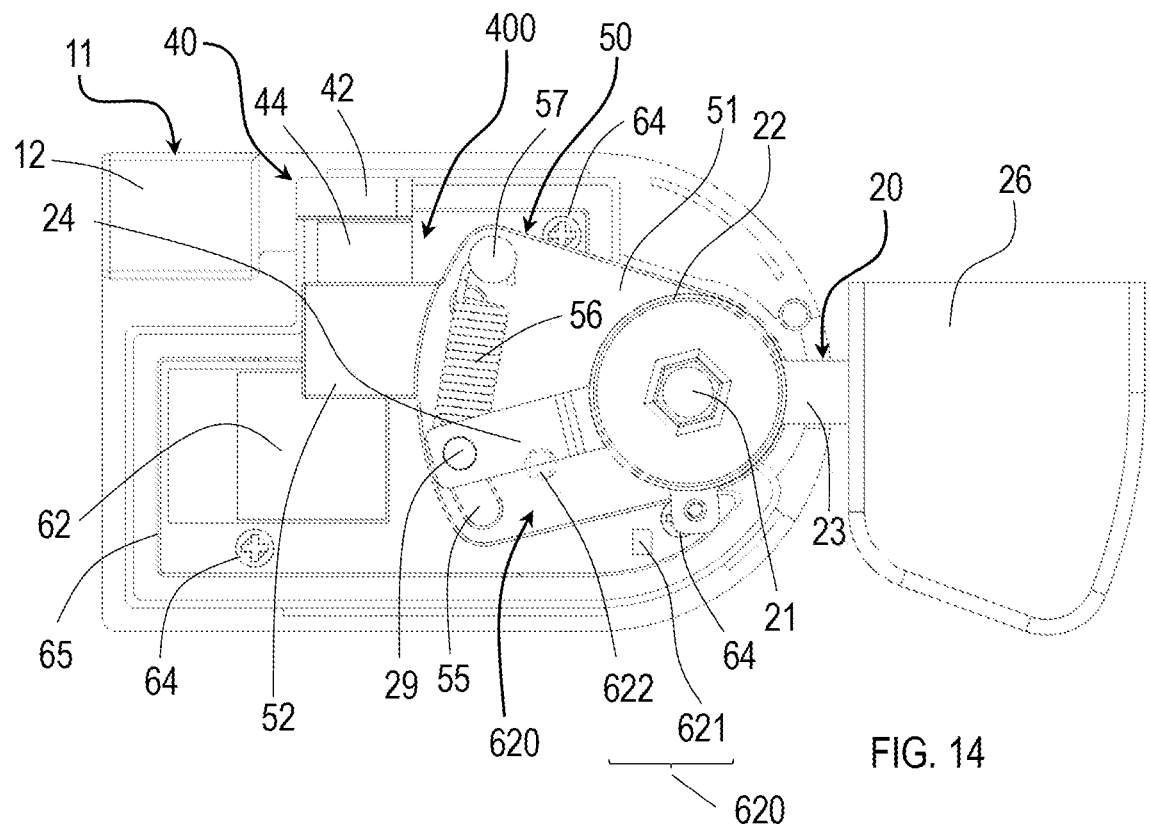
FIGS. 14 and 15 are views similar to those of FIGS. 9 and 10, which show in detail a third embodiment of a magnetic control switch of the control device of the invention, in two different operating conditions of the control device.
Figure 15:
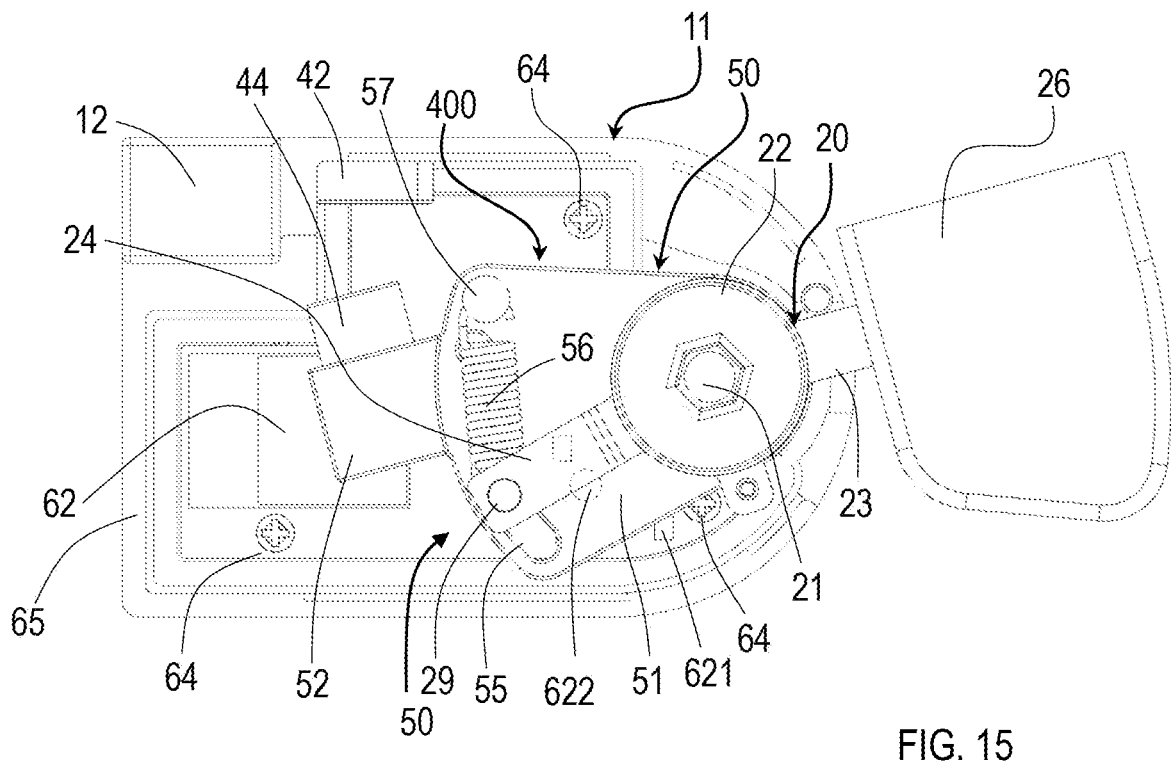

FIGS. 11, 14 and 15 illustrate a third embodiment of a magnetic control switch, configured to detect the actuation of the lever 20 by the cyclist, and to generate a corresponding control signal s2.

Such a magnetic control switch, generally indicated with reference numeral 620, differs from the magnetic command switches 60, 610 previously described in the different way of detecting the actuation of the lever 20.

In particular, the magnetic control switch 620 comprises a third element, preferably a magnet 622 mounted on the snapping element 51 of the clicking device 50 of the clicking mechanism 400, and a fourth element, preferably a magnetic sensor 621 mounted on the printed circuit board 65 close to the snapping element 51. Vice-versa, the magnet 622 can be mounted on the printed circuit board 65 close to the snapping element 51, and the magnetic sensor 621 on the snapping element 51.

By providing for its two own cooperating elements, the magnetic control switch 620 turns out to be independent of the magnetic clicking switch 40.

With particular reference, again, to FIG. 11, the magnetic sensor 621 is in communication, in a wired or wireless manner, with the electronic communication unit 62, which receives the control signal s2 generated by the sensor 621, processes it and transmits it, through the wireless transmitter 63, to the bicycle component to be controlled. Alternatively, the magnetic sensor 621 can be connected directly, by electric wire or wireless, to the bicycle component to be controlled.

When the lever 20 is in its rest position, the magnetic sensor 621 and the magnet 622 are arranged such a distance apart that the magnetic sensor 621 does not detect the magnetic field generated by the magnet 622.

Following the actuation of the lever 20, and in particular following the rotation of the snapping element 51 about the pin 21, due to the elastic force exerted by the spring 56, the magnet 622 approaches the magnetic sensor 621, which detects the magnetic field generated thereby. The magnetic sensor 621 thus generates, in real time or after a predetermined delay, the control signal s2, which is transmitted, directly or through the electronic communication unit 62, to the bicycle component to be commanded.

From the above description it can be understood that the snapping device 50 is, more generally, part of the control device 10, being suitable not only to cooperate with the lever 20 to actuate the clicking mechanism 400, but also to cooperate with the lever 20 to issue the command to the bicycle equipment through the magnetic control switch 60, 610, 620.

However, it should be understood that in a simplified embodiment, the snapping device 50 could be absent, the second element 44 of the magnetic clicking switch 40 of the clicking mechanism 400 and/or one of the elements of the magnetic control switch 60, 610, 620 being directly associated with the lever 20 so that the lever 20 directly controls the magnetic control switch 60, 610, 620 and/or the magnetic clicking switch 40 of the clicking mechanism 400. The tactile and/or acoustic feeling will be provided by the moving away from each other of, and return into contact of, the elements 42, 44 of the magnetic clicking switch 40 of the clicking mechanism 400.

Figure 16:
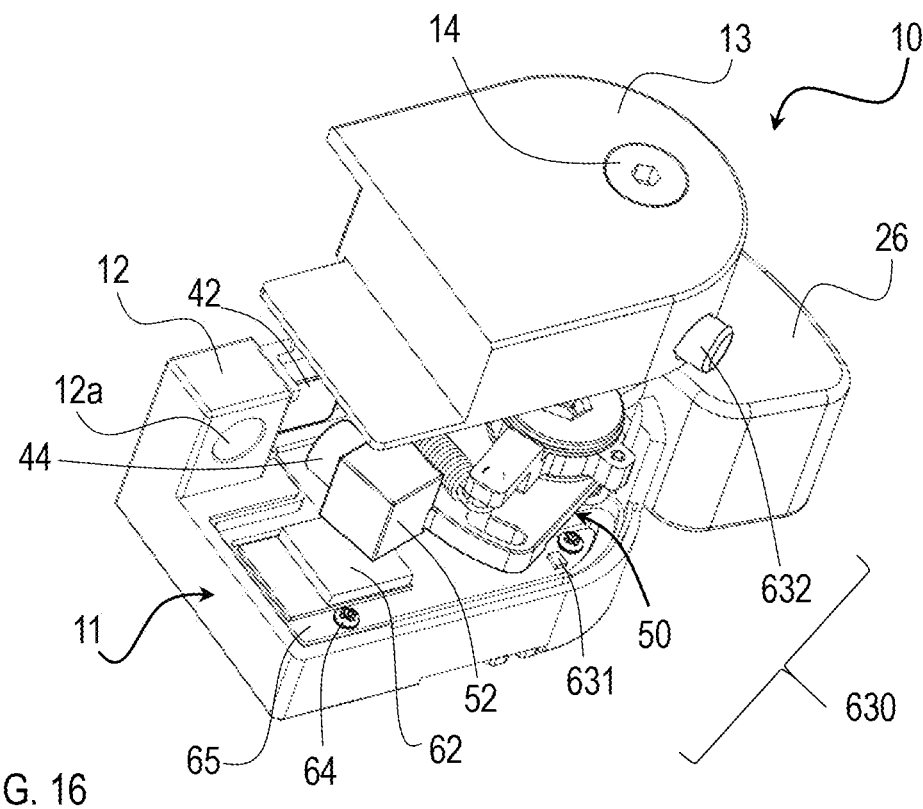
FIG. 16 is a partially exploded view, which shows some details of the control device of FIG. 1.

As shown in greater detail in FIG. 16, the control device 10 comprises an auxiliary magnetic switch 630, unrelated with the linkage of the lever 20. In particular, the auxiliary magnetic switch 630 comprises an auxiliary magnetic sensor 631 and an auxiliary magnet 632.

The auxiliary magnetic sensor 631 is suitable for detecting the presence of the auxiliary magnet 632 and for generating a control signal s3 (see FIG. 11), which is transmitted, directly or through the electronic communication unit 62, to the bicycle component to be controlled.

In the embodiment illustrated in FIG. 16, the auxiliary magnetic sensor 631 is mounted on the printed circuit board 65, preferably at a peripheral portion of the body 11 of the control device 10, while the auxiliary magnet 632 is mounted on the cover 13 and is movable with respect thereto, according to a button-type movement, between a position extracted from the cover 13, wherein it is sufficiently spaced from the auxiliary magnetic sensor 631 so that the auxiliary magnetic sensor 631 does not detect its presence, and a position partially inserted into the cover 13, wherein the auxiliary magnetic sensor 631 detects the magnetic field generated thereby and generates the command signal s3, which is transmitted, directly or through the electronic communication unit 62, to the component of the bicycle to be commanded.

Alternatively or in addition, an external auxiliary magnet 632 can be provided for, to be laid in a suitable seat 634 (shown in FIG. 17) formed at the body 11 or at the cover 13 of the control device 10, or simply to be brought near the control device 10 when one wishes to generate a further command signal for the equipment or component of the bicycle commanded by the control device 10 or for a different component of the bicycle.

In particular, it can be a mode button associated with the configuration and/or with the pairing (association of wireless devices in a network), that in principle is not to be actuated during normal use of the bicycle.

In the control device 10 there are also light signaling means, in electrical communication with the control switch 60, 620 or with the auxiliary magnetic switch 630 of the control device 10, and suitable for indicating an operating condition of the control device 10. With reference to FIG. 11, such light signaling means consist of an LED (Light Emitting Diode) 80 in electrical communication with the magnetic sensor 61, 611, 621, 631 of the magnetic control switch 60, 610, 620 or of the auxiliary magnetic switch 630.

Preferably, the LED is in electrical communication with the electronic communication unit 62, which manages the switching on thereof as a function of a status or an operating condition of the control device 10 and/or of the bicycle equipment. For example, in case of a control device for upward gearshifting of the rear derailleur of the bicycle, the LED switches on when the gearshifting mechanism triggers, i.e. when the rear derailleur displaces the chain onto a toothed wheel having a larger diameter.

Figure 17:
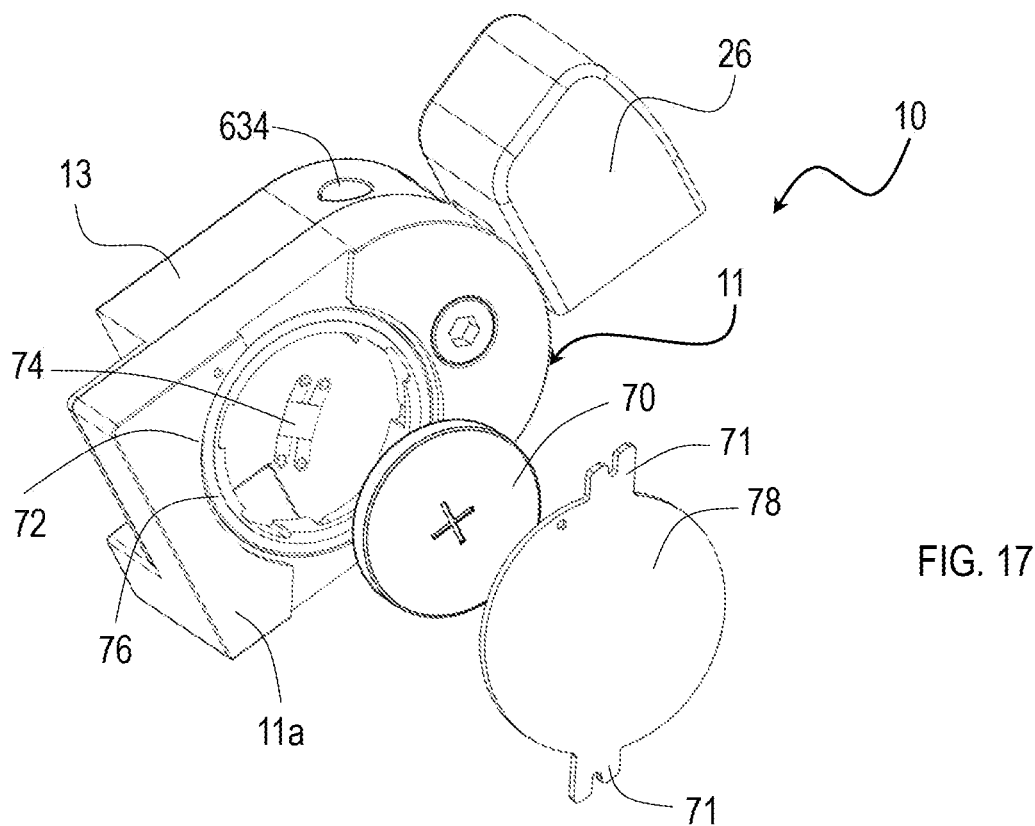
FIG. 17 is a partially exploded perspective bottom view, which shows further details of the control device of FIG. 1.

With reference now to FIGS. 11 and 17, the control device 10 further comprises power supply means, in the illustrated embodiment a battery 70, preferably of the button type. Of course, it is possible to use other types of battery, even of the rechargeable type, suitable for the purpose.

Preferably, the battery 70 is in communication with the electronic communication unit 62, through which it supplies power to the magnetic control switch 60, 610, 620, the auxiliary magnetic switch 630 and the LED 80, where provided for. Alternatively, the electronic communication unit 62 can be omitted, and in that case the battery 70 directly supplies power to the aforementioned electronic components.

The battery 70 is housed in a preferably circular seat 72, so formed in a bottom surface 11a of the body 11 as to leave a portion of the printed circuit board 65 uncovered, in which contacts 74 for the battery 70 are present.

In the housing seat 72 a groove is also formed for housing a sealing element 76, for example an O-ring.

The seat 72 is furthermore closed by a cap 78 provided with tabs 71, which cooperate with matching elements (not shown) formed in the body 11 of the control device 10, to keep the cap 78 in locked position onto the seat 72.

From the description that has been made, the features of the control device being the subject-matter of the present invention are clear, just as the related advantages are also clear.

Further variants of the embodiments described above are possible, without departing from the teachings of the invention.

The above is a description of various embodiments of inventive aspects, and further changes can be made without departing from the scope of the present invention. The shape and/or size and/or location and/or orientation of the various components can be changed. The functions of a component can be carried out by two or more components and vice-versa. Components shown directly connected to or contacting each other can have intermediate structures arranged between them. The details shown in a figure and/or described with reference to a figure or to an embodiment can apply in other figures or embodiments. Not all of the details shown in a figure or described in the same context need necessarily be present in a same embodiment. Features or aspects that turn out to be innovative with respect to the prior art, alone or in combination with other features, should be deemed to be described per se, independently of what is explicitly described as innovative.

What is claimed is:

1. A bicycle control device for issuing at least one command to at least one bicycle equipment, the control device comprising:
   a body configured to be mounted on the bicycle;
   at least one manual actuation member associated with the body; and
   a clicking mechanism that provides at least one of a tactile impulse or acoustic impulse in response to successful actuation of said at least one command;
   wherein said clicking mechanism comprises a magnetic clicking switch having a first element that is fixed with respect to the body, and a second element that is movable with respect to the first element and actuatable by said at least one manual actuation member when said manual actuation member issues said command.

2. The bicycle control device according to claim 1, wherein said clicking mechanism comprises a snapping device, said second element of the magnetic clicking switch being rigidly associated with said snapping device.

3. The bicycle control device according to claim 2, wherein said manual actuation member is a lever comprising a driving arm and a driven arm, said snapping device comprising a plate-like element wherein an opening for slidably housing a first pin associated with the driven arm of the lever is formed, said snapping device comprising in particular a spring having one end associated with said first pin and the other end associated with a second pin carried by said plate-like element.

4. The bicycle control device according to claim 3, further comprising a lever cover associated with said driving arm of said lever, said lever cover having a slot for receiving a fixing screw for adjusting the lever cover on said lever.

5. The bicycle control device according claim 1, further comprising a control switch switched through an actuation of said manual actuation member and for generating, in response thereto, a signal (s1; s2) to issue said command.

6. The bicycle control device according to claim 5, wherein said control switch is a magnetic control switch comprising a magnetic sensor mounted at or a suitable distance from said second element of the magnetic clicking switch of the clicking mechanism.

7. The bicycle control device according to claim 6, wherein said magnetic sensor of the magnetic control switch is suitable for detecting one among: a variation of a magnetic field generated by said magnetic clicking switch; absence/presence of the magnetic field generated by said magnetic clicking switch; a polarity of said first or second element of said magnetic clicking switch.

8. The bicycle control device according to claim 6, wherein said magnetic control switch comprises a third element that is fixed with respect to the body, and a fourth element that is movable with respect to the third element and actuatable by said at least one manual actuation member when said manual actuation member issues said command.

9. The bicycle control device according to claim 5, further comprising an electronic communication unit, preferably of a wireless type, configured to receive said signal (s1; s2) to issue said command generated by the control switch and to control, in response thereto, said at least one equipment of the bicycle.

10. The bicycle control device according to claim 1, further comprising an auxiliary magnetic switch, which includes an auxiliary magnetic sensor and an auxiliary magnet.

11. The bicycle control device according to claim 1, further comprising power supply means, in particular consisting of at least one battery received in a seat formed in said body of the control device, preferably said seat being closed by a cap.

12. The bicycle control device according to claim 1, wherein said at least one equipment of the bicycle is selected from the group consisting of a mechanical or electromechanical derailleur, a cycle computer and a brake.

13. A bicycle control device for issuing at least one command to at least one bicycle equipment, the control device comprising:
  a body configured to be mounted on the bicycle;
  at least one manual actuation member associated with the body;
  a clicking mechanism;
    wherein said clicking mechanism comprises a magnetic clicking switch having a first element that is fixed with respect to the body, and a second element that is movable with respect to the first element and actuatable by said at least one manual actuation member when said manual actuation member issues said command;
  a control switch switched through an actuation of said manual actuation member and for generating, in response thereto, a signal (s1; s2) to issue said command,
  an electronic communication unit configured to receive said signal (s1; s2) to issue said command generated by the control switch and to control, in response thereto, said at least one equipment of the bicycle, and
  a first seat for housing said magnetic clicking switch, and a second seat, separate from said first seat, for housing said electronic communication unit.

14. The bicycle control device according to claim 13, wherein said second housing seat comprises a sealed chamber for containing said electronic communication unit.

15. The bicycle control device according to claim 14, wherein said sealed chamber is delimited by said body and by a protective lid that is tight sealed, in particular by means of a sealing resin.

* * * * *